United States Patent Office 3,049,054
Patented Aug. 14, 1962

3,049,054
ASTRONOMICAL CAMERAS AND OPTICAL SYSTEMS THEREFOR
Robert Louis Waland, Orlington, Priestden Place, St. Andrews, Scotland
Filed Nov. 24, 1958, Ser. No. 776,068
Claims priority, application Great Britain Nov. 26, 1957
11 Claims. (Cl. 88—57)

This invention relates to astronomical or the like cameras and optical systems therefor.

According to the present invention I provide, in or for an astronomical or the like camera, an optical system comprising a meniscus lens, a substantially spherical concave primary mirror having an aperture on the optical axis of the system, and intermediate said lens and primary mirror, a substantially spherical convex secondary mirror, the arrangement being such that light rays passing through the lens to the primary mirror are reflected on to the secondary mirror and from the latter through the aperture in the primary mirror to the focal plane which is to the side of the primary mirror remote from the secondary mirror and lens, and a field flattening lens intermediate the primary mirror and focal plane.

Figure 1:
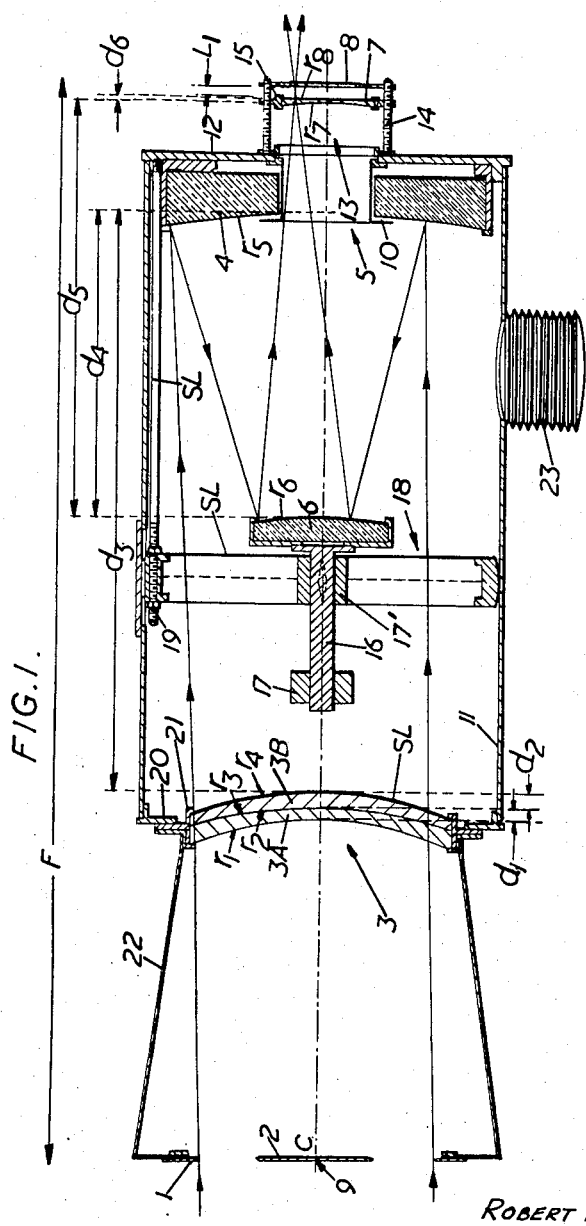
Figure 2:
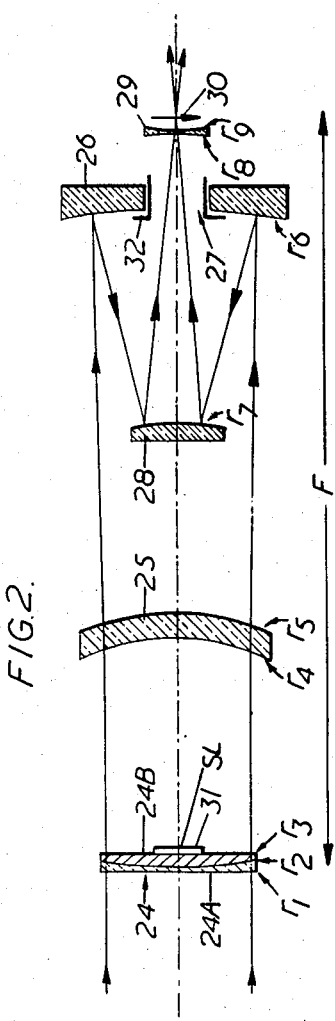

Embodiments of the invention will now be described, by way of example, with reference to the accompanying diagrammatic drawings, in which:

FIG. 1 is a sectional side elevation of one embodiment of an astronomical camera according to the invention, and FIG. 2 is a sectional side elevation of an alternative embodiment of the camera, showing only the optical system thereof.

Referring to FIG. 1 of the drawing, an astronomical camera has an optical system located to the rear of an entrance pupil diaphragm 1 and central stop 2 and consists of a meniscus lens 3, a spherical concave primary mirror 4 having a central hole 5, and a spherical convex secondary mirror 6 located intermediate the primary mirror 4 and meniscus lens 3. The arrangement, as shown, is such that light rays indicated by arrowed lines entering through the entrance pupil diaphragm 1 and past the central stop 2, which lie in the same plane, pass through the meniscus lens 3 to the primary mirror 4 and are reflected therefrom to the secondary mirror 6 which reflects them through the hole 5 in the primary mirror 4 and a plano-concave field flattening lens 7 to the focal plane in which a photographic plane 8 is located.

The meniscus lens 3 is achromatic and is formed by two component lenses, 3A, 3B which are in contact and make the composite lens 3 monocentric, and are formed respectively of Chance's Borosilicate Crown glass and Chance's Soft Crown glass. The two mirrors 4, 6 are made from glass of low thermal expansion and are aluminised by a high vacuum deposit on their reflecting surfaces. The plano-concave field flattening lens 7 is made from Chance's Borosilicate Crown and is placed, as shown, with its concave surface towards the mirrors 4, 6. The whole optical system is monocentric apart from the contacting faces of the meniscus lens 3 and the field flattening lens 7. That is to say, the outer faces of the meniscus lens 3 and the reflecting surfaces of the two mirrors 4, 6 have a common centre of curvature 9, and the latter is located in the plane of the entrance pupil 1. An annular diaphragm 10 is also placed around the hole of the primary mirror 4 and very close to the reflecting surface thereof. The purpose of the central stop 2 in the plane of the entrance pupil and the annular diaphragm 10 is to prevent secondary imaging by the mirrors 4, 6 which would fog the photographic plate 8 during exposures.

The optical system described has a flat field of about 4° diameter and is aplanatic to a high degree. A suitable focal ratio is F/4.5. Any pair of glasses may be used for the meniscus lens 3 provided they have the same refractive index to within about ±0.002 for the most actinic region of the spectrum depending on the type of photographic plate used and the transmissive properties of the glasses. The exclusive use of crown glasses and mirrors ensures the maximum transmission in the ultra violet region of the spectrum. Great improvements in the near future of the transmissive properties of the lighter crown glasses is expected, and in such a case the use of pure fused quartz for the field flattener lens 7 would be advantageous. The glasses for the meniscus lens 3 have sufficient difference in their V values, about 8 or more to avoid large variations in thickness of the individual component lenses 3A, 3B. Chromatism may be adjusted by changing the radius of curvature of the contacting faces of the meniscus lens 3A, 3B. Practically all the light crown glasses are suitable for the field flattening lens 7. Their use would mean small changes in the distance of the flat surface from the focal surface. This movement annuls the small transverse chromatism produced by the achromatic meniscus lens 3 away from the centre of the field.

The optical system above described is mounted within a casing consisting of a tube 11 having at one end an end cap 12 having a central aperture 13 corresponding to aperture 5 and locating around the aperture 13 a tubular mounting 14 for the lens 7 and plate 8, the lens 7 being mounted in a holder or ring 15 which together with lens 7 seals that end of the camera. The mirror 6 is mounted on one end of a slide 16 having a counterweight 17 at its other end and sliding in a slideway provided in the hub 17' of a spider 18. The slide 16 permits coarse adjustment of the mirror 6 axially relative to the spider 18 and mirror 4, and the spider 18 is itself axially adjustable of the tube 11 by adjustable screws 19 to give fine adjustment of the mirror 6 and to permit slight canting adjustment of mirror 6 to locate the centre of the curvature 9 on the optical axis of the system. At its other end, the tube 11 is an annular end ring 20 mounting a holder or ring 21 for the lens 3, and the camera is sealed at that end by the lens 3 and ring 21. The ring 21 supports one end of a frustro-conical casing 22 which at its other end mounts the diaphragm 1 and central stop or diaphragm 2, the latter being attached to the diaphragm 1 by radial wires, not shown, coinciding with the arms of the spider 18. A bellows pressure equaliser 23 communicating with the casing is also provided.

In a second embodiment, not shown, the optical system is exactly similar to that described above, except that the primary mirror 4 is very slightly touched or figured by the constructing optician to remove the higher order spherical aberration introduced by the meniscus lens. The amount removed from the sphere is a matter of fringes even at apertures of 2 feet. Since the sphere is the nearest conic section such a surface is referred to as "substantially spherical." By leaving such an operation to the skilled optical technician the aberrations can be balanced over the entire field. In this way, the always better on-axis images are slightly spoiled to improve those formed off-axis.

In a third embodiment, not shown, the touching or figuring is applied to the secondary mirror leaving the primary exactly spherical. It is anticipated that only in large cameras, say from 15 inches apertures and over, need the technique of touching or treating be applied.

In a fourth embodiment shown in FIG. 2 an astronomical camera has an optical system located to the rear of an entrance pupil—a zero power hyper-chromatic corrector plate 24—and consists of a meniscus lens 25, a spherical primary mirror 26 having a central hole 27, and a spherical convex secondary mirror 28 located intermediate the primary mirror 26 and the meniscus lens 25. The arrangement, as shown is such that light rays, indicated by the arrowed lines entering through the zero plate entrance pupil 24 pass through the meniscus lens 25 to the primary mirror 26 and are reflected therefrom to the secondary mirror 28 which reflects them through the hole 27 in the primary mirror 26. The light rays then pass through a very thin field flattening lens 29 placed just inside the focal plane 30 in which a photographic plate, not shown, is located. As in the FIG. 1 embodiment, a central stop 31 and annular diaphragm 32 are provided to prevent secondary imaging by the mirrors.

The zero plate 24 consists of two lenses 24A, 24B of Chance's Borosilicate Crown glass and Chance's Soft Crown glass. The two lenses 24A, 24B are in contact on their curved surfaces, this curvature having been adjusted to give the necessary hyper-chromatic correction needed to balance the chromatic aberration of the following meniscus lens 25. The total power with flat outer surfaces is zero, with an ideal matched pair of glasses. In practice, small departures from this rigorous condition can be tolerated.

The meniscus lens 25 is a single monocentric lens of Chance's Borosilicate Crown glass. Other light glasses may be used provided the curves are adjusted accordingly. The two mirrors 26, 28 are made from glass of low thermal expansion and are aluminised by a high vacuum deposit on their reflecting surfaces.

The optical system described has a flat field of about 4–5° diameter and is aplanatic to a high degree. A suitable focal ratio is F/4.5. Any pair of lenses may be used for the zero plate provided they have the same refractive index Nd to within ±0.002 and have sufficient difference, about 10, in their V values.

The higher orders of spherical aberration left by the meniscus may be completely removed in this system by aspherising one or other of the flat surfaces of the zero plate by figuring, preferably the inner surface in practice. The outer surface is more liable to be damaged in use and could be more readily reworked if flat.

The exclusive use of crown glasses and mirrors ensures the maximum transmission in the ultra violet region of the spectrum. The system is monocentric insofar as the meniscus lens 25 and mirrors 26, 28 are concerned, the common centre of curvature being located inside the zero plate 24 near the optical vertex of the inner curved surface.

The optical system shown in FIG. 2 is mounted within a casing, not shown, in a manner similar to that in FIG. 1.

As a result of the invention, the following advantages over hitherto known optical systems arise. In all embodiments the field is flat and accessible. The cameras are almost entirely free from off axis aberrations and give superb imaging, and chromatism is greatly reduced to about 1/200 of a pure lens system of similar aperture and focal ratio. In all embodiments, manufacture is considerably simplified and reduced in expense due to the fact that all lens and mirror surfaces are spherical, or very slightly figured in the larger sizes. The use of mirrors make it possible to increase appreciably the working aperture of cameras in general, and the systems permit the use of relatively short tubular casings so that bending of the tube and consequent image distortion is eliminated or reduced.

In all embodiments, the use of a field flattening lens makes it possible to seal hermetically the complete camera. Provision of the breathing device or pressure equaliser prevents any changes in barometric pressure straining the optical elements. By replacing the air in the camera by desiccated nitrogen, the camera does not require any attention under normal conditions. Hitherto, the aluminum coating required to be replaced every few years, and usually a thick coat of dust was deposited within about six to twelve months of use. This necessitated dismantling the camera and readjustment of the optical system which was a time consuming operation, and it was found to be almost impossible to repeat mirror adjustments exactly after each dismantling. For every accurate astrometry, astronomy of position, it is highly desirable that the mirrors should not be disturbed over a long period of time, say 50 years or over. As a result of the invention, such ideal conditions are made possible with mirrors. Also, the general design makes possible a cavity casing to support the optical system which may be thermostatically temperature controlled and so prevent any focus changes during long exposures due to temperature gradients on the mirrors which are particularly sensitive, and unlike lenses in this respect. In a sealed camera, dewing in damp weather on the interior surfaces and consequent damage to the aluminum deposit, does not occur. Nitrogen being an inert gas stops all oxidisation of the film. Furthermore, nitrogen has a slightly lower refractive index than air and so tube currents are reduced. The meniscus component lenses in the FIG. 1 embodiment could be "siliconoiled" together to prevent distortion, in place of the usual balsam. Cryoliting the two inner surfaces of the meniscus and field flattener would increase transmission of the complete camera.

The camera according to the invention may be used as a military reconnaissance camera, as it may easily be constructed with an aperture of 2 feet or more and a focal length of 110 inches or more, so that even at heights of several hundreds of miles it would yield valuable information by resolving down to one second of arc on the earth's surface, atmospheric conditions permitting.

The mounting of the optical elements and the tube design in catadioptric systems of large dimensions has usually been a very complex and costly operation, but it is believed that in the embodiments above described the camera may be constructed with a one-piece single or cavity tube up to about 24 inches aperture, and this further reduces the constructional cost of the camera.

It is explained that cameras having catadioptric optical systems are in themselves already known. One example is the Schmidt camera which employs a concave spherical mirror and a thin aspheric plate. In this system the field is inaccessible as it lies between the mirror and plate and is curved. Moreover, the plate has a fourth order profile and is very difficult and costly to produce.

The use of a single glass monocentric meniscus lens has been proposed to replace the Schmidt plate. In one such arrangement, the field is again curved and inaccessible, and, while the system is free from coma and astigmatism, an objectionable amount of chromatism arises in large sizes of cameras. Another form has an accessible but very restricted field for visual work only.

A system employing two mirrors and a Schmidt plate has also been proposed. In this system, while the field is flat and accessible, the difficulties and high costs involved in manufacturing the Schmidt plate and compensated tube remain. Moreover, the tube is open at the plate holder end and is consequently open to dust, dewing, extremes of temperature and requires dismantling at regular intervals to clean and readjust.

A further known system, for meteor photography, employs two monocentric meniscus lenses with a zero plate between them, and one spherical mirror, but the field is curved and very inaccessible, so much so that the camera must be opened like a book to load the photographic material.

A tabulated statical description applicable to the embodiment shown in FIG. 1 will now be given with reference to the drawing.

From the drawing F shown at the top is the equivalent focal length of the camera. All the linear dimensions needed to construct this camera are shown as fractions of this amount. In other words F=unity, and the length $d_1$, for example, is not given but $$\frac{d_1}{F}$$

is given.

$d_1$=axial thickness of first meniscus component= 0.010536
$d_2$=axial thickness of second meniscus component= 0.014752
$d_3$=distance between second meniscus component and primary=0.523118
$d_4$=distance between primary and secondary=0.276463
$d_5$=distance from secondary to field flattener lens= 0.376000
$d_6$=axial thickness of field flattener=0.005711
$r_1$=radius of 1st surface of meniscus=0.307409
$r_2, r_3$=contacting surfaces of meniscus, radii=0.440411
$r_4$=radius of 4th surface of meniscus=0.332696
$r_5$=radius of primary mirror=0.855817
$r_6$=radius of secondary mirror=0.579352
$r_7$=radius of concave surface of field flattener=0.330833
$r_8$=radius of flat surface of field flattener=
Working diameter of meniscus=0.23785
Working diameter of primary mirror=0.29456
Working diameter of secondary mirror=0.12076
Working diameter of field flattener=0.08956
Distance of Image from field flattener $L_1$=0.01004
Linear diameter of field covered=0.05855
Angular diameter of field covered=about 4°
Diameter of entrance pupil=¼.5=0.22222
Diameter of central stop=0.10246
Diameter of annular diaphragm on primary mirror= 0.12076

Glasses used:
  For meniscus lens nearest entrance pupil—
    Chance's Borosilicate Crown:
$$\left.\begin{array}{l}N_c=1.51520\\N_d=1.51768\\N_f=1.52329\end{array}\right\}=64.01$$
  For second lens of meniscus—
    Chance's Soft Crown:
$$\left.\begin{array}{l}N_c=1.51188\\N_d=1.51466\\N_f=1.52101\end{array}\right\}=56.39$$
  For field flattener—
    Chance's Borosilicate Crown:
$$\left.\begin{array}{l}N_c=1.51450\\N_d=1.51697\\N_f=1.52256\end{array}\right\}=64.16$$

A tabulated statistical description applicable to the embodiment shown in FIG. 2 is now given. The equivalent focal length F=unity. The dimensions given are fractions of this amount. In FIG. 2, the symbols $d_1$ to $d_8$ are not shown but correspond to those in FIG. 1.

$d_1$=axial thickness of first zero plate component =0.0053884
$d_2$=axial thickness of second zero plate component =0.0107768
$d_3$=distance between inner zero plate component and meniscus=0.3047678
$d_4$=thickness at axis of meniscus=0.0258643
$d_5$=distance between meniscus and primary mirror =0.5366308
$d_6$=distance between primary and secondary mirrors =0.2827724
$d_7$=distance between secondary mirror and field flattener =0.3989140
$d_8$=axial thickness of field flattener=0.0020153
$r_1$=outside radius of zero plate (flat)
$r_2$=contacting surfaces of zero plate radii=1.136952
$r_3$=inside radius of zero plate (flat)
$r_4$=concave radius of meniscus=0.3128504
$r_5$=convex radius of meniscus=0.3387148
$r_6$=radius of primary mirror=0.8753454
$r_7$=radius of secondary mirror=0.5925730
$r_8$=inside radius of field flattener=0.3383807
$r_9$=outside radius of field flattener (flat)
Working diameter of zero plate=0.22222
Working diameter of meniscus=0.24328
Working diameter of primary mirror=0.30129
Working diameter of secondary mirror=0.12351
Working diameter of field flattener=0.09161
Linear diameter of field covered=0.05989
Angular diameter of field covered=about 4¼°
Diameter of central stop on zero plate=0.10480
Diameter of annular diaphragm round hole of primary mirror=0.12351

Glasses used:
  Outside lens of zero plate.—
    Chance's Borosilicate Crown:
$$\left.\begin{array}{l}N_c=1.51477\\N_d=1.51725\\N_f=1.52286\end{array}\right\}=63.91$$
  Inside lens of zero plate.—
    Chance's Soft Crown:
$$\left.\begin{array}{l}N_c=1.51229\\N_d=1.51507\\N_f=1.52143\end{array}\right\}=56.35$$
  Single meniscus lens.—
    Chance's Borosilicate Crown as above.
  Field flattener lens.—
    Chance's Borosilicate Crown:
$$\left.\begin{array}{l}N_c=1.51450\\N_d=1.51697\\N_f=1.52256\end{array}\right\}=64.16$$

I claim:
1. Optical image-forming lens and mirror system, the components of which lie on a common axis, comprising an achromatic and monocentric meniscus lens in which the internal surface thereof is curved and through which incident light first passes, a substantially spherical concave primary mirror spaced from said meniscus lens having an aperture in the optical axis of the system and on which incident light from said meniscus lens is reflected, a substantially spherical convex secondary mirror disposed intermediate said meniscus lens and primary mirror and on which reflected light from said primary mirror is reflected, a field flattening lens arranged intermediate said primary mirror and focal plane opposite said aperture of said primary mirror and through which reflected light from said secondary mirror is passed, and a tubular casing in which the above optical and mirror system is mounted as a closed structure.

2. An optical system as claimed in claim 1, in which said meniscus lens comprises two monocentric and intercontacting component lenses.

3. An optical system as claimed in claim 1, in which the meniscus lens is a single component lens having monocentric faces and a zero power hyperchromatic corrector plate is mounted in front of said meniscus lens.

4. An optical system as claimed in claim 1, in which the casing is sealed at opposite ends by the meniscus lens and the field flattening lens and holders therefor.

5. An optical system as claimed in claim 1, in which a central stop is mounted in front of the meniscus lens, and the primary mirror has an annular diaphragm around its central aperture to prevent secondary imaging by the mirrors.

6. An optical system as claimed in claim 1, in an astronomical or the like camera, in which the secondary mirror is mounted in the casing for coarse and fine adjustment axially of the system and for fine canting adjustment.

7. An optical system as claimed in claim 1, in which one of the mirrors is touched or figured to remove high order spherical aberration introduced by the meniscus lens.

8. An optical system as claimed in claim 7, in which the casing is filled with desiccated nitrogen.

9. An optical system as claimed in claim 8, in which the casing is provided with an internal pressure equalising device.

10. An optical system as claimed in claim 3, in which the zero plate comprises two component lenses having inner curved surfaces intercontacting and flat outer surfaces.

11. An optical system as claimed in claim 10, in which one of the outer faces of the zero plate is figured.

References Cited in the file of this patent

UNITED STATES PATENTS

| | | |
|---|---|---|
| 1,968,267 | Straubel | July 31, 1934 |
| 2,380,887 | Warmisham | July 31, 1945 |
| 2,420,349 | Bouwers | May 13, 1947 |
| 2,492,461 | Bouwers | Dec. 27, 1949 |
| 2,504,383 | Bouwers et al. | Apr. 18, 1950 |
| 2,563,433 | Taylor | Aug. 7, 1951 |
| 2,670,656 | Braymer | Mar. 2, 1954 |
| 2,682,197 | Davis | June 29, 1954 |
| 2,683,394 | Polyanyi et al. | July 13, 1954 |
| 2,685,820 | Kaprelian | Aug. 10, 1954 |
| 2,793,564 | Bouwers et al. | May 28, 1957 |
| 2,817,270 | Mandler | Dec. 24, 1957 |

FOREIGN PATENTS

| | | |
|---|---|---|
| 426,539 | Great Britain | Apr. 4, 1935 |
| 784,435 | Great Britain | Oct. 9, 1957 |
| 1,112,846 | France | Nov. 23, 1955 |